US008812338B2

(12) United States Patent
Pratt

(10) Patent No.: US 8,812,338 B2
(45) Date of Patent: Aug. 19, 2014

(54) COMPUTER-IMPLEMENTED SYSTEMS AND METHODS FOR PACK OPTIMIZATION

(75) Inventor: Robert William Pratt, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 825 days.

(21) Appl. No.: 12/111,312

(22) Filed: Apr. 29, 2008

(65) Prior Publication Data

US 2009/0271241 A1    Oct. 29, 2009

(51) Int. Cl.
*G06Q 10/00* (2012.01)

(52) U.S. Cl.
USPC ............ 705/7.25; 414/902; 705/7.31; 705/28

(58) Field of Classification Search
USPC .................. 414/902; 705/7.25, 7.31, 28
See application file for complete search history.

(56) References Cited

U.S. PATENT DOCUMENTS

| 5,175,692 | A | * | 12/1992 | Mazouz et al. ............... 700/217 |
| 5,195,172 | A | | 3/1993 | Elad et al. |
| 5,319,781 | A | * | 6/1994 | Syswerda ..................... 705/7.25 |
| 5,627,973 | A | | 5/1997 | Armstrong et al. |
| 5,652,842 | A | | 7/1997 | Siegrist, Jr. et al. |
| 5,712,989 | A | * | 1/1998 | Johnson et al. ................. 705/28 |
| 5,767,854 | A | | 6/1998 | Anwar |
| 5,799,286 | A | | 8/1998 | Morgan et al. |
| 5,867,494 | A | | 2/1999 | Krishnaswamy et al. |
| 5,926,820 | A | | 7/1999 | Agrawal et al. |
| 5,946,662 | A | * | 8/1999 | Ettl et al. ....................... 705/7.26 |
| 5,953,707 | A | | 9/1999 | Huang et al. |
| 5,963,910 | A | | 10/1999 | Ulwick |
| 5,999,908 | A | | 12/1999 | Abelow |
| 6,009,407 | A | | 12/1999 | Garg |
| 6,014,640 | A | | 1/2000 | Bent |
| 6,023,684 | A | | 2/2000 | Pearson |
| 6,029,139 | A | | 2/2000 | Cunningham et al. |
| 6,041,267 | A | * | 3/2000 | Dangat et al. ................. 700/107 |
| 6,076,071 | A | | 6/2000 | Freeny, Jr. |
| 6,078,892 | A | | 6/2000 | Anderson et al. |
| 6,115,691 | A | | 9/2000 | Ulwick |

(Continued)

FOREIGN PATENT DOCUMENTS

| EP | 1413955 | 4/2004 |
| WO | 0111522 | 2/2001 |
| WO | 2007/002841 | 1/2007 |

OTHER PUBLICATIONS

Renaud, Jacques, Boctor, Fayez, Ouenniche, Jamal, 2000, A heuristic for the pickup and delivery traveling salesman problem, Computers and Operations Research pp. 905-916.*

(Continued)

*Primary Examiner* — Beth V Boswell
*Assistant Examiner* — Stephen S Swartz
(74) *Attorney, Agent, or Firm* — Kilpatrick Townsend & Stockton LLP

(57) ABSTRACT

Computer-implemented systems and methods are provided for optimizing the distribution of packs of an item across an entity's distribution network. Constraint values may be specified to limit the values that may be included in a planned distribution of packs. Also, heuristics may be used to reduce the computation time required to determine optimal values for a planned distribution of packs. Modeling of the planned distribution of packs and optimization of the number of packs to be distributed can be accomplished using a mixed-integer linear programming solver.

16 Claims, 9 Drawing Sheets

(56) References Cited

U.S. PATENT DOCUMENTS

| | | | | |
|---|---|---|---|---|
| 6,119,102 | A | 9/2000 | Rush et al. | |
| 6,151,582 | A * | 11/2000 | Huang et al. | 705/7.25 |
| 6,175,876 | B1 | 1/2001 | Branson et al. | |
| 6,182,060 | B1 | 1/2001 | Hedgcock et al. | |
| 6,208,908 | B1 | 3/2001 | Boyd et al. | |
| 6,226,623 | B1 | 5/2001 | Schein et al. | |
| 6,236,977 | B1 | 5/2001 | Verba et al. | |
| 6,237,138 | B1 | 5/2001 | Hameluck et al. | |
| 6,249,768 | B1 | 6/2001 | Tulskie et al. | |
| 6,263,315 | B1 | 7/2001 | Talluri | |
| 6,275,812 | B1 | 8/2001 | Haq et al. | |
| 6,286,005 | B1 | 9/2001 | Cannon | |
| 6,321,133 | B1 * | 11/2001 | Smirnov et al. | 700/100 |
| 6,321,206 | B1 | 11/2001 | Honarvar | |
| 6,341,266 | B1 | 1/2002 | Braun | |
| 6,341,269 | B1 | 1/2002 | Dulaney et al. | |
| 6,397,224 | B1 | 5/2002 | Zubeldia et al. | |
| 6,456,999 | B1 | 9/2002 | Netz | |
| 6,470,344 | B1 | 10/2002 | Kothuri et al. | |
| 6,484,179 | B1 | 11/2002 | Roccaforte | |
| 6,502,077 | B1 | 12/2002 | Speicher | |
| 6,526,526 | B1 | 2/2003 | Dong et al. | |
| 6,546,135 | B1 | 4/2003 | Lin et al. | |
| 6,553,352 | B2 | 4/2003 | Delurgio et al. | |
| 6,560,501 | B1 * | 5/2003 | Walser et al. | 700/99 |
| 6,581,068 | B1 | 6/2003 | Bensoussan et al. | |
| 6,584,447 | B1 | 6/2003 | Fox et al. | |
| 6,611,829 | B1 | 8/2003 | Tate et al. | |
| 6,640,215 | B1 | 10/2003 | Galperin et al. | |
| 6,643,659 | B1 | 11/2003 | MacIsaac et al. | |
| 6,728,724 | B1 | 4/2004 | Megiddo et al. | |
| 6,735,570 | B1 | 5/2004 | Lacy et al. | |
| 6,750,864 | B1 | 6/2004 | Anwar | |
| 6,836,689 | B2 * | 12/2004 | Walser et al. | 700/100 |
| 6,898,603 | B1 | 5/2005 | Petculescu et al. | |
| 6,901,406 | B2 | 5/2005 | Nabe et al. | |
| 6,907,382 | B2 | 6/2005 | Urokohara | |
| 6,937,992 | B1 * | 8/2005 | Benda et al. | 705/7.26 |
| 6,970,830 | B1 | 11/2005 | Samra et al. | |
| 7,039,594 | B1 | 5/2006 | Gersting | |
| 7,062,447 | B1 | 6/2006 | Valentine et al. | |
| 7,068,267 | B2 | 6/2006 | Meanor et al. | |
| 7,085,734 | B2 | 8/2006 | Grant et al. | |
| 7,089,266 | B2 | 8/2006 | Stolte et al. | |
| 7,092,896 | B2 | 8/2006 | Delurgio et al. | |
| 7,092,918 | B1 | 8/2006 | Delurgio et al. | |
| 7,092,929 | B1 | 8/2006 | Dvorak et al. | |
| 7,130,811 | B1 | 10/2006 | Delurgio et al. | |
| 7,133,876 | B2 | 11/2006 | Roussopoulos et al. | |
| 7,133,882 | B1 | 11/2006 | Pringle et al. | |
| 7,171,376 | B2 | 1/2007 | Ramakrishnan | |
| 7,210,624 | B1 | 5/2007 | Birjandi et al. | |
| 7,236,949 | B2 | 6/2007 | Natan et al. | |
| 7,240,019 | B2 | 7/2007 | Delurgio et al. | |
| 7,249,031 | B2 | 7/2007 | Close et al. | |
| 7,251,615 | B2 | 7/2007 | Woo | |
| 7,302,400 | B2 | 11/2007 | Greenstein | |
| 7,302,410 | B1 | 11/2007 | Venkatraman et al. | |
| 7,310,646 | B2 | 12/2007 | Rangadass et al. | |
| 7,346,538 | B2 | 3/2008 | Reardon | |
| 7,370,366 | B2 | 5/2008 | Lacan et al. | |
| 7,379,890 | B2 | 5/2008 | Myr et al. | |
| 7,395,255 | B2 | 7/2008 | Li | |
| 7,440,903 | B2 | 10/2008 | Riley et al. | |
| 7,505,482 | B2 | 3/2009 | Adamczyk et al. | |
| 7,516,083 | B1 | 4/2009 | Dvorak et al. | |
| 7,519,908 | B2 | 4/2009 | Quang et al. | |
| 7,536,361 | B2 | 5/2009 | Alberti et al. | |
| 7,617,119 | B1 | 11/2009 | Neal et al. | |
| 7,668,761 | B2 | 2/2010 | Jenkins et al. | |
| 7,689,456 | B2 | 3/2010 | Schroeder et al. | |
| 7,747,339 | B2 | 6/2010 | Jacobus et al. | |
| 7,752,067 | B2 | 7/2010 | Fotteler et al. | |
| 7,756,945 | B1 | 7/2010 | Andreessen et al. | |
| 7,798,399 | B2 | 9/2010 | Veit | |
| 7,877,286 | B1 | 1/2011 | Neal et al. | |
| 7,895,067 | B2 | 2/2011 | Ramakrishnan | |
| 8,112,300 | B2 | 2/2012 | Harper | |
| 8,515,835 | B2 | 8/2013 | Wu et al. | |
| 2001/0047293 | A1 | 11/2001 | Waller et al. | |
| 2002/0013757 | A1 | 1/2002 | Bykowsky et al. | |
| 2002/0046096 | A1 | 4/2002 | Srinivasan et al. | |
| 2002/0072953 | A1 | 6/2002 | Michlowitz et al. | |
| 2002/0099678 | A1 | 7/2002 | Albright et al. | |
| 2002/0107723 | A1 | 8/2002 | Benjamin et al. | |
| 2002/0116237 | A1 | 8/2002 | Cohen et al. | |
| 2002/0123930 | A1 | 9/2002 | Boyd et al. | |
| 2002/0143669 | A1 | 10/2002 | Scheer | |
| 2002/0169654 | A1 | 11/2002 | Santos et al. | |
| 2002/0169655 | A1 | 11/2002 | Beyer et al. | |
| 2002/0178426 | A1 | 11/2002 | Bye | |
| 2002/0188499 | A1 | 12/2002 | Jenkins et al. | |
| 2003/0023598 | A1 | 1/2003 | Janakiraman et al. | |
| 2003/0028437 | A1 | 2/2003 | Grant et al. | |
| 2003/0050845 | A1 | 3/2003 | Hoffman et al. | |
| 2003/0078830 | A1 | 4/2003 | Wagner et al. | |
| 2003/0083924 | A1 | 5/2003 | Lee et al. | |
| 2003/0083925 | A1 | 5/2003 | Weaver et al. | |
| 2003/0088458 | A1 | 5/2003 | Afeyan et al. | |
| 2003/0097292 | A1 | 5/2003 | Chen et al. | |
| 2003/0110072 | A1 | 6/2003 | Delurgio et al. | |
| 2003/0110080 | A1 | 6/2003 | Tsutani et al. | |
| 2003/0120584 | A1 | 6/2003 | Zarefoss et al. | |
| 2003/0126010 | A1 | 7/2003 | Barns-Slavin | |
| 2003/0126136 | A1 | 7/2003 | Omoigui | |
| 2003/0167098 | A1 * | 9/2003 | Walser et al. | 700/100 |
| 2003/0172007 | A1 | 9/2003 | Helmolt et al. | |
| 2003/0172145 | A1 | 9/2003 | Nguyen | |
| 2003/0208402 | A1 | 11/2003 | Bibelnieks et al. | |
| 2003/0208420 | A1 | 11/2003 | Kansal | |
| 2003/0220830 | A1 | 11/2003 | Myr | |
| 2003/0229502 | A1 | 12/2003 | Woo | |
| 2003/0236721 | A1 | 12/2003 | Plumer et al. | |
| 2004/0093296 | A1 | 5/2004 | Phelan et al. | |
| 2004/0103051 | A1 | 5/2004 | Reed et al. | |
| 2004/0111388 | A1 | 6/2004 | Boiscuvier et al. | |
| 2004/0111698 | A1 | 6/2004 | Soong et al. | |
| 2004/0199781 | A1 | 10/2004 | Erickson et al. | |
| 2004/0210489 | A1 | 10/2004 | Jackson et al. | |
| 2004/0230475 | A1 | 11/2004 | Dogan et al. | |
| 2005/0033761 | A1 | 2/2005 | Guttman et al. | |
| 2005/0066277 | A1 | 3/2005 | Leah et al. | |
| 2005/0096963 | A1 | 5/2005 | Myr et al. | |
| 2005/0197896 | A1 | 9/2005 | Viet et al. | |
| 2005/0198121 | A1 | 9/2005 | Daniels et al. | |
| 2005/0256726 | A1 | 11/2005 | Benson et al. | |
| 2005/0256753 | A1 | 11/2005 | Viet et al. | |
| 2005/0262108 | A1 | 11/2005 | Gupta | |
| 2005/0267901 | A1 | 12/2005 | Irlen | |
| 2005/0288989 | A1 | 12/2005 | Kim et al. | |
| 2005/0289000 | A1 | 12/2005 | Chiang et al. | |
| 2006/0008803 | A1 | 1/2006 | Brunner et al. | |
| 2006/0010067 | A1 | 1/2006 | Notani et al. | |
| 2006/0047608 | A1 | 3/2006 | Davis et al. | |
| 2006/0069598 | A1 | 3/2006 | Schweitzer et al. | |
| 2006/0074728 | A1 | 4/2006 | Schweitzer et al. | |
| 2006/0143030 | A1 | 6/2006 | Wertheimer | |
| 2006/0235557 | A1 | 10/2006 | Knight et al. | |
| 2006/0248010 | A1 | 11/2006 | Krishnamoorthy et al. | |
| 2007/0050195 | A1 * | 3/2007 | Malitski | 705/1 |
| 2007/0055482 | A1 | 3/2007 | Goodermote et al. | |
| 2007/0100981 | A1 | 5/2007 | Adamczyk et al. | |
| 2007/0136150 | A1 * | 6/2007 | Biancavilla et al. | 705/28 |
| 2007/0174119 | A1 | 7/2007 | Ramsey et al. | |
| 2007/0174146 | A1 | 7/2007 | Tamarkin et al. | |
| 2007/0208608 | A1 | 9/2007 | Amerasinghe et al. | |
| 2007/0223462 | A1 | 9/2007 | Hite et al. | |
| 2007/0288296 | A1 | 12/2007 | Lewis | |
| 2008/0077459 | A1 | 3/2008 | Desai et al. | |
| 2008/0086392 | A1 * | 4/2008 | Bishop et al. | 705/28 |
| 2008/0140581 | A1 | 6/2008 | Mayer | |
| 2008/0140688 | A1 | 6/2008 | Clayton et al. | |
| 2008/0208678 | A1 | 8/2008 | Walser et al. | |
| 2008/0208719 | A1 | 8/2008 | Sharma et al. | |

(56) References Cited

U.S. PATENT DOCUMENTS

| | | | |
|---|---|---|---|
| 2009/0112675 A1 | 4/2009 | Servais | |
| 2009/0271241 A1 | 10/2009 | Pratt | |
| 2010/0114669 A1 | 5/2010 | Birjandi et al. | |
| 2010/0145501 A1* | 6/2010 | Guilbert et al. | 700/218 |
| 2011/0071877 A1 | 3/2011 | Ettl et al. | |
| 2011/0145030 A1 | 6/2011 | Allen | |
| 2012/0054076 A1 | 3/2012 | Wu et al. | |
| 2012/0179505 A1 | 7/2012 | DePaola et al. | |
| 2012/0179506 A1 | 7/2012 | DePaola et al. | |
| 2012/0179507 A1 | 7/2012 | DePaola et al. | |

OTHER PUBLICATIONS i2 Technologies, Inc., "Improving Service and Market Share with i2 Inventory Optimization: How superior inventory management can be deployed as a competitive weapon to drive the top and the bottom line", pp. 1-26 (Aug. 2004).
Cognizant Technology Solutions, "Pre Pack Optimization: Increasing Supply Chain Efficiency", pp. 1-26 (undated).
Armstrong, Mark, "Multiproduct Nonlinear Pricing", Econometrica, vol. 64, No. 1, pp. 51-75 (Jan. 1996).
Armstrong, Ronald D. et al., The Multiple-Choice Nested Knapsack Model, Management Science, vol. 28, No. 1, pp. 34-43 (Jan. 1982).
Balas, Egon et al., "OCTANE: A New Heuristic for Pure 0-1 Programs," Operations Research, 2001 Informs, vol. 49, No. 2, pp. 207-225 (Mar.-Apr. 2001).
Balintfy et al, Binary and Chain Comparisons with an Experimental Linear Programming Food Price Index, The Review of Economics and Statistics, vol. 52, No. 3, pp. 324-330 (Aug. 1970).
Baud, Nicolas et al., "Internal data, external data and consortium data for operational risk measurement: How to pool data properly?", Groupe de Recherche Operationnelle, Credit Lyonnais, France, pp. 1-18 (Jun. 1, 2002).
Beamon, "Supply chain design and analysis: models and methods," International Journal of Production Economics (1998).
Chettri, Inderlal Singh et al., "Pre Pack Optimization: Increasing Supply Chain Efficiency", Cognizant Technology Solutions, pp. 1-26 (undated).
Cohen et al., "SAS/OR Optimization Procedures, with Applications to the Oil Industry," SAS Institute, SUGI Proceedings (1994).
Cook et al., "Evaluating Suppliers of Complex Systems: A multiple criteria approach," The Journal of the Operational Research Society (Nov. 1992).
De Prisco et al., "On Optimal Binary Search Trees", Information Processing Letters, vol. 45, pp. 249-253 (Apr. 1993).
Haupt, J, "Enterprise Wide Data Warehousing with SAP BW," SAP AG, pp. 1-38 (2004).
Hollander, Geoffrey, "Modell deftly parses customer characteristics", InfoWorld, vol. 20, No. 21, pp. 1-4, retrieved from Dialog, file 148 (May 25, 1998).
Horngren, Charles T. et al., "Cost Accounting a Managerial Emphasis", Tenth Edition, Chapter 14, pp. 497-534 (2000).
Howard, Philip, "Data Warehousing with SAS," Bloor Research, pp. 1-13 (2005).
Johnson, Ellis et al, Recent Developments and Future Directions in Mathematical Programming, IBM Systems Journal, vol. 31, No. 1, pp. 79-93 (1992).
Kearney, "Advances in Mathematical Programming and Optimization in the SAS System," SAS Institute, SUGI Proceedings (1999).
Kelley, Dave, "Merchandise Intelligence: Predictive insights improve bottom line," RIS News, p. 32 (Mar. 2006).
Lee, Eon-Kyung et al., "An effective supplier development methodology for enhancing supply chain performance," ICMIT (2000).
Lee, Eon-Kyung et al., "Supplier Selection and Management system Considering Relationships in Supply Chain Management," IEEE Transactions on Engineering Management (Aug. 2001).
Manchanda et al, The "Shopping Basket"; A Model for Multi-Category Purchase Incidence Decisions, Marketing Science, vol. 18, pp. 95-114 (Nov. 2, 1999).

McDonald, Kevin et al., "Mastering the SAP® Business Information Warehouse," Wiley Publishing, Inc., pp. 1-18, 35-88, and 279-332 (Sep. 2002).
Medaglia, Andres, "Simulation Optimization Using Soft Computing," dissertation for Operations Research Department at North Carolina State University (Jan. 24, 2001).
Na, H.S. et al., "Data Scaling for Operational Risk Modelling", ERIM Report Series Research in Management, 24 pp. (Dec. 2005).
Pedersen et al., "Multidimensional Database Technology", IEEE, Computer, vol. 34, Issue 12, pp. 40-46 (Dec. 2001).
Peemoller, Fred A., "Operational Risk Data Pooling", Frankfurt/Main, Deutsche Bank AG, 38 pp. (Feb. 7, 2002).
Pisinger, David, "A Minimal Algorithm for the Multiple-Choise Knapsack Problem", Technical Report 94/25, DIKU, University of Copenhagen, Denmark, pp. 1-23 (May 1984).
Porter-Kuchay, Multidimensional Marketing, Target Marketing (Jan. 2000).
Ramirez, Ariel Ortiz, "three-Tier Architecture," Linux Journal, downloaded from http://www.linuxjournal.com/article/3508, 4 pp. (Jul. 1, 2000).
Rosen, Michele, "There's Gold in That There Data", Insurance & Technology, vol. 23, No. 12, pp. 1-6, retrieved from Dialog, file 16 (Dec. 1998).
Saarenvirta, Data Mining to Improve Profitability, CMA Magazine, vol. 72, No. 2, pp. 8-12 (Mar. 1998).
Samudhram, Ananda, "Solver setting for optimal solutions," New Straits Times (Nov. 22, 1999).
Schindler, Robert M. et al., "Increased Consumer Sales Response Though Use of 99-Ending Prices," Journal of Retailing, vol. 72(2), pp. 187-199, ISSN: 0022-4359 (1996).
Smith, Michael John Sebastian, "Application-Specific Integrated Circuits," Addison-Wesley Longman, Inc., Chapter 1: Introduction to ASICS, cover page and pp. 20-34.
Spiegelman, "Optimizers Assist in Specialized marketing Efforts," Computer Reseller News (Nov. 22, 1999).
White, John W., "Making ERP Work the Way Your Business Works," Fuego, ERP White Paper, pp. 1-8 (2002).
Business Wire, "Perfect and Open Ratings Form Alliance to Provide Critical Supplier Performance Ratings to Private Exchanges and Net Markets" (Oct. 30, 2000).
Business Wire, "SAS and Kohl's Partner on Merchandise Intelligence Suite," downloaded from http://findarticles.com/p/articles/mi_m0EIN/is_2005_Jan_17/ai_n8695858/, 2 pp. (Jan. 17, 2005).
Data Mining News, Looking Past Automation, MarketSwitch Focuses on Optimization of Marketing Campaigns, Data Mining News (May 10, 1999).
"i2 Technologies: i2 releases i2 five.two-the complete platform for dynamic value chain management; flexible, intuitive, powerful solutions designed to help companies gain efficiencies and drive revenue", M2 Presswire (Oct. 25, 2001).
Microsoft, MSDN, Chapter 5: Layered Application Guidelines, downloaded from http://msdn.microsoft.com/en-us/libraryfee658109(d=printer).aspx (10 pp.).
Microsoft, MSDN, Three-Layered Services Application, downloaded from http://msdn.microsoft.com/en-us/library/ff648105(d=printer).aspx (6 pp.).
Modell by Group 1 Software, www.gl.com, retrieved from Google.com and archive.org., pp. 1-16 (Aug. 29, 1999).
Data Model definition from Wikipedia (18 pp.).
Enterprise Application Integration definition from Wikipedia (7 pp.).
Enterprise Information Integration definition from Wikipedia (3 pp.).
Multitier Architecture definition from Wikipedia (4 pp.).
Service-Oriented Architecture definition from Wikipedia (19 pp.).
Software as a Service definition from Wikipedia (7 pp.).
SAS Institute, Inc., www.sas.com, retrieved from Google.com and archive.org, pp. 1-28 (Jan. 29, 1998).
Millin, Vincent, Jun. 22, 2004 International Search Report from PCT/US03/13394 (1 pg.).
Wang, Pu, "Pack Optimization Problem: Models and Solutions Methods," Dissertation, North Carolina State University, Raleigh, NC, Nov. 2010.
Kurz Sascha, Rambau Jorg, Schluchtermann Jorg, and Wolf Rainer, 2008, The Top-Dog Index, pp. 1-23.

(56) References Cited

OTHER PUBLICATIONS

Elmaghraby Salah and Bawle Vishwas, 1972, Optimization of Batch Ordering under Deterministic Variable Demand, pp. 508-517.
Hsiao Yu-Cheng, 2008, Optimal single-cycle policies for the one-warehouse multi-retailer inventory/distribution system, pp. 219-229.
Gaul Constantin, Kurz Sacha, and Rambau Jorg, 2008, Lotsize Optimization Leading to a Median problem with cardinalities.
Notice of Allowance of Apr. 17, 2013 for U.S. Appl. No. 12/871,487 20 pages.
Final Office Action of Jul. 18, 2013 for U.S. Appl. No. 12/987,489, 27 pages.
Final Office Action of Sep. 12, 2013 for U.S. Appl. No. 12/987,486, 20 pages.
Final Office Action of Sep. 19, 2013 for U.S. Appl. No. 12/987,495, 23 pages.
Bertsimas et al., "Introduction to Linear Optimization" Athena Scientific, Belmont, Massachusetts, 1997, pp. 505-506, 530.
Arnold, Jens et al., "Evolutionary Optimization of a Multi-location Inventory Model with Lateral Transshipments," Faculty of Informatics, Technical University of Chemnitz-Zwickau, 09107 Chemnitz, Germany, 11 pp. (1996).
Bolat, Ahmet et al., "A Surrogate Objective for Utility Work in Paced Assembly Lines," Technical Report 91-32, pp. 1-17 (Oct. 1991).
Hababou, Moez et al., "Variable Selection in the Credit Card Industry," NESUG 2006 Analysis pp. 1-5 (2006).
Scheiber et al., "Surrogate time series," Physica D 142, pp. 346-382 (2000).
Siddiqi, Naeem, "Credit Risk Scorecards—Developing and Implementing Intelligent Credit Scoring," John Wiley & Sons, Inc., pp. 1-196 (2006).
Lee, Calvin B. Ph.D., "Multi-Echelon Inventory Optimization," Evant White Paper Series, pp. 1-13 (2003).
Mangal, Dharamvir et al., "Inventory Control in Supply Chain Through Lateral Transshipment—A Case Study in Indian Industry," International Journal of Engineering (JJE), vol. 3, Issue 5, pp. 443-457 (Jan. 2009).
Paterson, Colin et al., "Inventory Models with Lateral Transshipments: A Review," 19 pp. (Aug. 26, 2009).
Yang, Guangyuan et al., "Service Parts Inventory Control with Lateral Transshipment that takes Time," Tinbergen Institute Discussion Paper, TI 2010-025/4, 22 pp.(2010).
Aberdeen Group Research Brief, "IBM Puts a Pragmatic Face on Advanced Inventory Optimization," pp. 1-6 (Apr. 11, 2006).
Manhattan Associates, "Multi-Echelon Inventory Optimization," pp. 1-9 (2009).
SAS Institute Inc., "Service Parts Optimization: Inventory vs. availability," pp. 1-13 (2006).
MID, Inc. "Advanced Merchandise Planning, Store Planning and Allocation" 1 pp. (2010).
De Villiers, Noelene, "The evolution of the Merchandising Processes at Woolworths, SA" National Retail Federation, NRF 97th Annual Convention & Expo, 21 pp. (Jan. 13-16, 2008).
TOREXRETAIL, "Merchandise and Assortment Planning" 6 pp. (Feb. 2007).
Non-Final Office Action of Mar. 13, 2012 for U.S. Appl. No. 12/871,487, 25 pages.
Non-Final Office Action of Aug. 14, 2012 for U.S. Appl. No. 12/987,486, 27 pages.
Non-Final Office Action of Sep. 25, 2012 for U.S. Appl. No. 12/987,489, 29 pages.
Non-Final Office Action of Nov. 14, 2012 for U.S. Appl. No. 12/987,495, 29 pages.
"ProfitLogic Launches ProfitLogic 2003: An Expanded Merchandise Optimization Suite including Assortment, Allocation, Markdown and Promotion Optimization," PR Newswire, New York, Jun. 10, 2003.
"SAS Size Optimization Fits Retailers Perfectly", NewsRX, Jan. 21, 2008.
"Advanced Allocation" MID Retail, Jun. 19, 2009, http://web.archive.org/...o90620003441/http://www.midretail.com/RetailProdcutSuite/AdvancedAllocation/tabid/107/Default.aspx 4 pages.
Notice of Allowance of Nov. 5, 2013 for U.S. Appl. No. 12/987,495, 28 pages.
Notice of Allowance of Mar. 4, 2014 for U.S. Appl. No. 12/987,486, 25 pages.

* cited by examiner

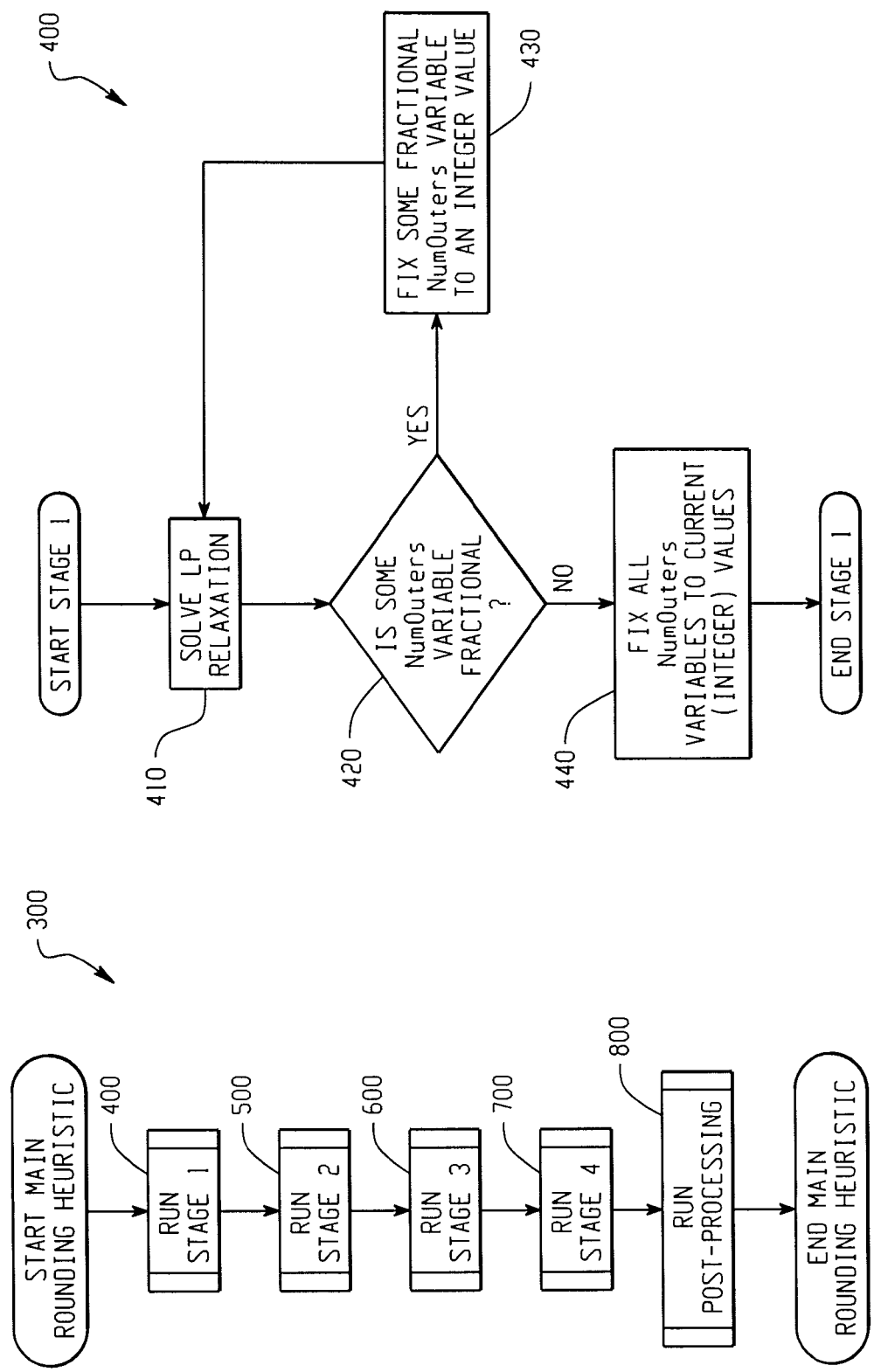

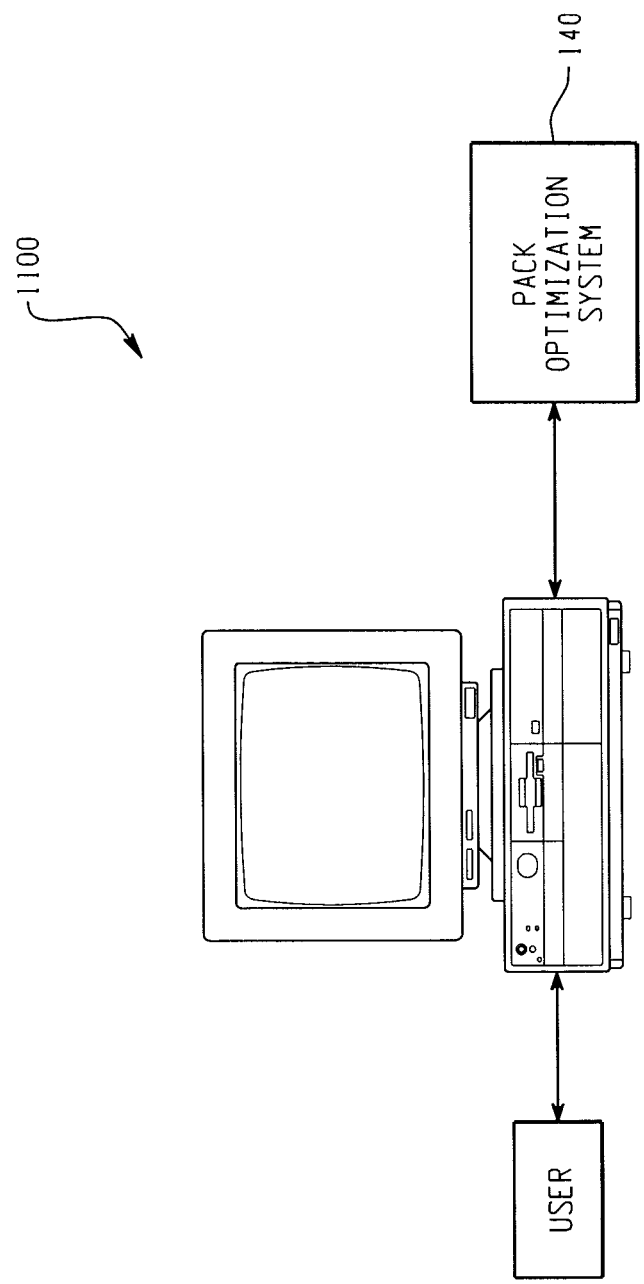

COMPUTER-IMPLEMENTED SYSTEMS AND METHODS FOR PACK OPTIMIZATION

TECHNICAL FIELD

The technology described in this patent application relates generally to optimizing the distribution of goods, and more specifically to systems and methods for pack optimization in a distribution model of two or more levels.

BACKGROUND

Entities that operate large-scale operations for the distribution of goods, such as national apparel retailers, often incorporate the concept of packs, which are pre-determined sets of a good that differ in one or more characteristics, such as color or size. Each such entity distributes packs among the end points of its distribution network. A pack optimization solution will ensure both minimization of the costs of shipping the packs to the end points of the distribution network and maximization of revenue derived from the supply of goods at the end points of the distribution network, such as through sales of apparel at an entity's retail locations. Thus, it is extremely important to entities that employ packs to distribute goods that pack distribution is optimized.

SUMMARY

In accordance with the teachings herein, computer-implemented systems and methods are provided to optimize the distribution of packs among the end points of a distribution network. Thus, for example, an entity that runs a large-scale distribution network, such as a national apparel retail chain, may forecast the expected demand for a particular good at each end point of its distribution network, such as a retailer's store locations. In addition to the information about the anticipated demand at each end point of its distribution network, an entity also specifies the costs associated with supplying an amount of the good that is not exactly equal to anticipated demand and information about the specific mix of the good contained in a pack. In addition, entities may define packs at more than one level. For example, one type of pack, which could be called an inner pack, may include six blue shirts, where three shirts are size medium, two shirts are size large, and one shirt is size small. Meanwhile, a second type of pack, which could be called an outer pack, would contain a set number of identical inner packs.

Solving a pack optimization instance makes use of the information described above, which is needed to generate an optimal distribution of packs among the end points of a distribution network, and the additional constraint that each end point must receive an integer number of packs. Due to the constraint that end points receive integer numbers of packs, one approach to the optimization that generally would be appropriate is the use of mixed-integer linear programming (MILP) methods. A factor that suggests MILP methods would not be favorable, though, is the potential number of end points in an entity's distribution network. Because the number of end points could be quite large, each optimization instance formulated as described is likely to be too complex for a generic MILP solver to solve quickly enough for the system to be commercially useful. The use of heuristics permits the exploitation of pack-specific structure within the optimization instance to produce good solutions quickly.

BRIEF DESCRIPTION OF THE DRAWINGS

FIG. 3 is a flow diagram depicting the stages of a main rounding heuristic.

FIG. 4 is a flow diagram depicting the steps of the first stage of a main rounding heuristic.

FIG. 11 is a block diagram depicting a single general purpose computer environment wherein a user can interact with a pack optimization system.

DETAILED DESCRIPTION

Figure 1:
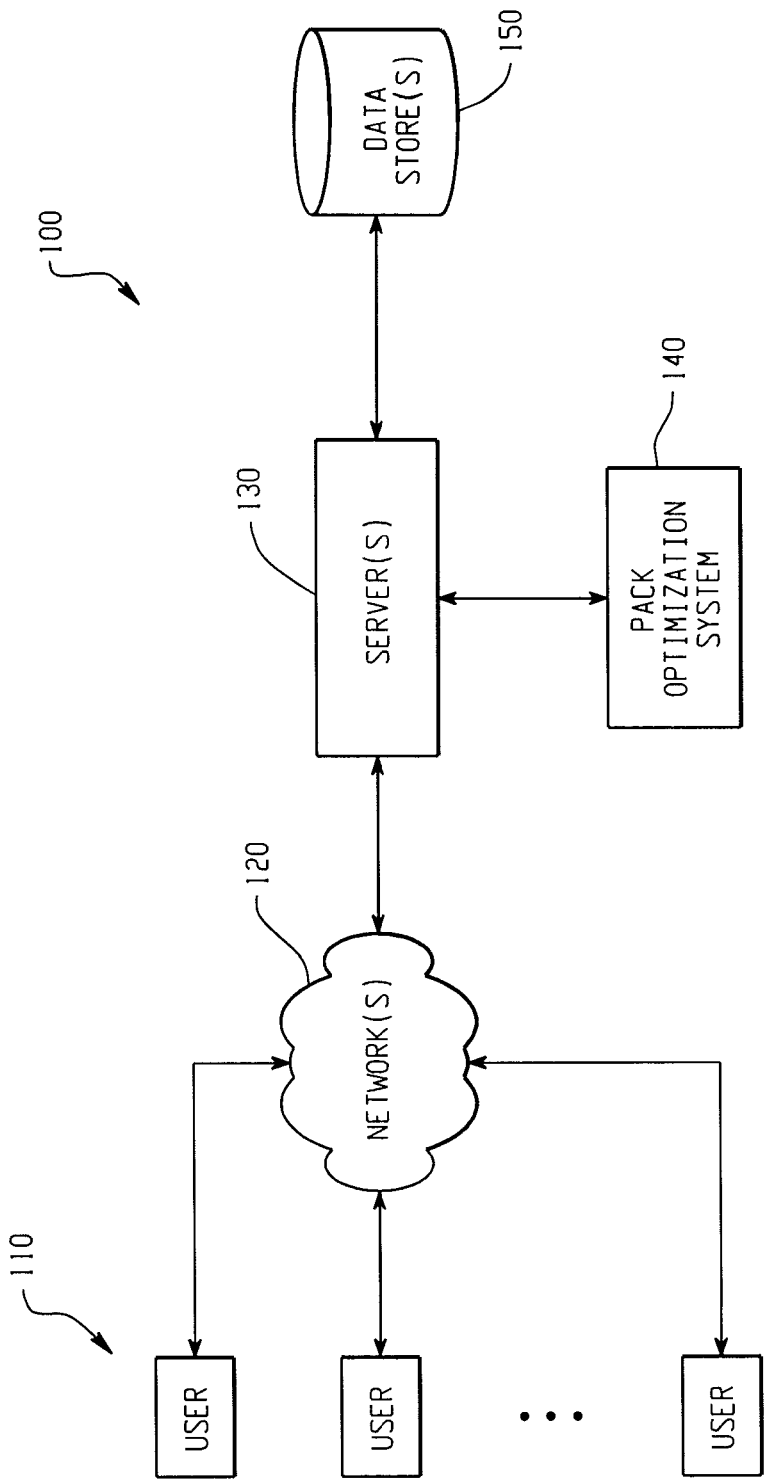
FIG. 1 is a block diagram depicting an environment in which users can interact with a pack optimization system.

FIG. 1 depicts at 100 an environment in which users can interact with a pack optimization system. Users 110 may interact with the pack optimization system in a number of ways, including for example via one or more networks 120. One or more servers 130 host the pack optimization system 140, and one or more data stores 150 may store the data analyzed by the system 140 and any intermediate or output data generated by the system 140.

The system 140 permits an entity that operates a large-scale distribution network to optimize a planned distribution of packs among the end points of its distribution network. Thus, for example, a national apparel retail chain may forecast the expected demand for a particular good at each end point of its distribution network, such as the retail stores operated by the retailer. In addition to the information about the anticipated demand at each end point of its distribution network, an entity also specifies the costs associated with supplying an amount of the good that is not exactly equal to anticipated demand and information about the specific mix of the good contained in a pack. In addition, entities may define packs at more than one level. For example, one type of pack, which could be called an inner pack, may include six blue shirts, where three shirts are size medium, two shirts are size large, and the sixth shirt is size small. The entity also could define a second type of pack, which might be called an outer pack, where each outer pack would contain a set number of identical inner packs.

It should be noted that the use of the term "end point" with respect to a distribution network, as described in this example, is not limited to a true final distribution destination (e.g., a retail store) for the items in the pack optimization formulation. In other examples, however, the term "end point" may be equivalent to the final distribution destination for the items in the pack optimization formulation. The methods and systems described herein may be used to solve pack optimization formulations in a distribution network having an arbitrary number of levels. Thus, for example, a national retail chain might employ regional distribution centers, each of which supplies certain of the chain's retail stores. Each of the regional distribution centers, then, could potentially be supplied by a national distribution center, or it may be that the chain makes use of an additional level of distribution between the national level and the regional level, such as super-regional distribution centers. Whatever the structure of a particular entity's distribution network, the solutions to pack optimization instances at the various levels within the network may be generated separately by the pack optimization system. Once created, the separate pack optimization solutions may be combined into a single pack optimization solution for the entire distribution network, if the entity (e.g., the national retail chain) so chooses. So, in the case where the pack optimization system is used to solve pack optimization instances in a three-level distribution network for a national apparel retail chain, the solution to the pack optimization instance for distributing packs from a national distribution center to regional distribution centers would treat the regional distribution centers as the end points, even though the pack optimization system will formulate and solve a separate pack optimization instance for distributing packs from the regional distribution centers to the chain's retail locations.

In the example of the national apparel retail chain, packs are defined on a "per-item" basis. Thus, a particular model of shirt, blue in color, would be one item, and a pack optimization system would formulate one pack optimization problem to be solved using MILP methods and the heuristics herein described, where the solution to that pack optimization instance would represent the optimal distribution of packs of that item. However, it is possible that the apparel retail chain would sell more than one color of a particular shirt, as well as other styles of shirts, not to mention other items of clothing, such as pants, shoes, jackets, etc. A national apparel retail chain might need to solve pack optimization problems for thousands, tens of thousands, or even hundreds of thousands of different items. Considering the scope of pack optimization instances that a pack optimization system is intended to solve, simplification of the individual pack optimization instances the system is used to solve will yield significant benefits.

The heuristics described herein are used to exploit pack-specific optimization problem structure to produce good solutions quickly. Solving the pack optimization problems using MILP methods will produce solutions that represent optimal distributions of packs among the end points of a distribution network, such as the retail chain's stores, but using MILP methods to solve the pack optimization problems directly is a computationally intensive process, potentially requiring compute time on the order of hours, where the time available to produce an optimal solution while still being a commercially useful system might be on the order of seconds. Thus, simplification, such as through the use of heuristics, may be applied to ensure both that optimal values are chosen for a planned distribution of packs and that the computation time necessary to solve a pack optimization problem may be reduced so that the optimization system is commercially useful. For example, if a pack optimization system determines that an optimization problem is amenable to separation on an end-point-by-end-point basis (e.g., store-by-store for a national apparel retail chain), the system could employ a separability heuristic. Using the separability heuristic, the pack optimization system may decompose the pack optimization problem for a particular item into narrower pack optimization problems reflecting the packs needed for a particular store. These simpler problems, then, may be solved directly using MILP to produce optimized values for a planned distribution of packs in a distribution hierarchy. The ability of the pack optimization system to directly solve the simpler problems using MILP is made possible by the significant reduction in computational complexity brought about by decomposing the initial optimization problem into multiple problems, each reflecting the needs of a particular store.

Another example of a heuristic that may be employed by a pack optimization system to solve pack optimization instances for goods across a distribution network is the main rounding heuristic. The main rounding heuristic solves a sequence of linear programming (LP) problems, starting with the LP relaxation (obtained by ignoring integrality constraints on all decision variables) of the MILP formulation. The heuristic proceeds in an iterative manner, first solving the relaxation using a generic LP solver, then determining an integer value to be assigned to one or more of the variables in the LP relaxation. Once a variable has been set to an integer value, the LP relaxation may be solved again, this time with the additional constraint that the one or more variables previously set to an integer value is held constant, thus permitting the iterative approach to produce a set of integer values for the variables defined in the optimization instance.

Figure 2:
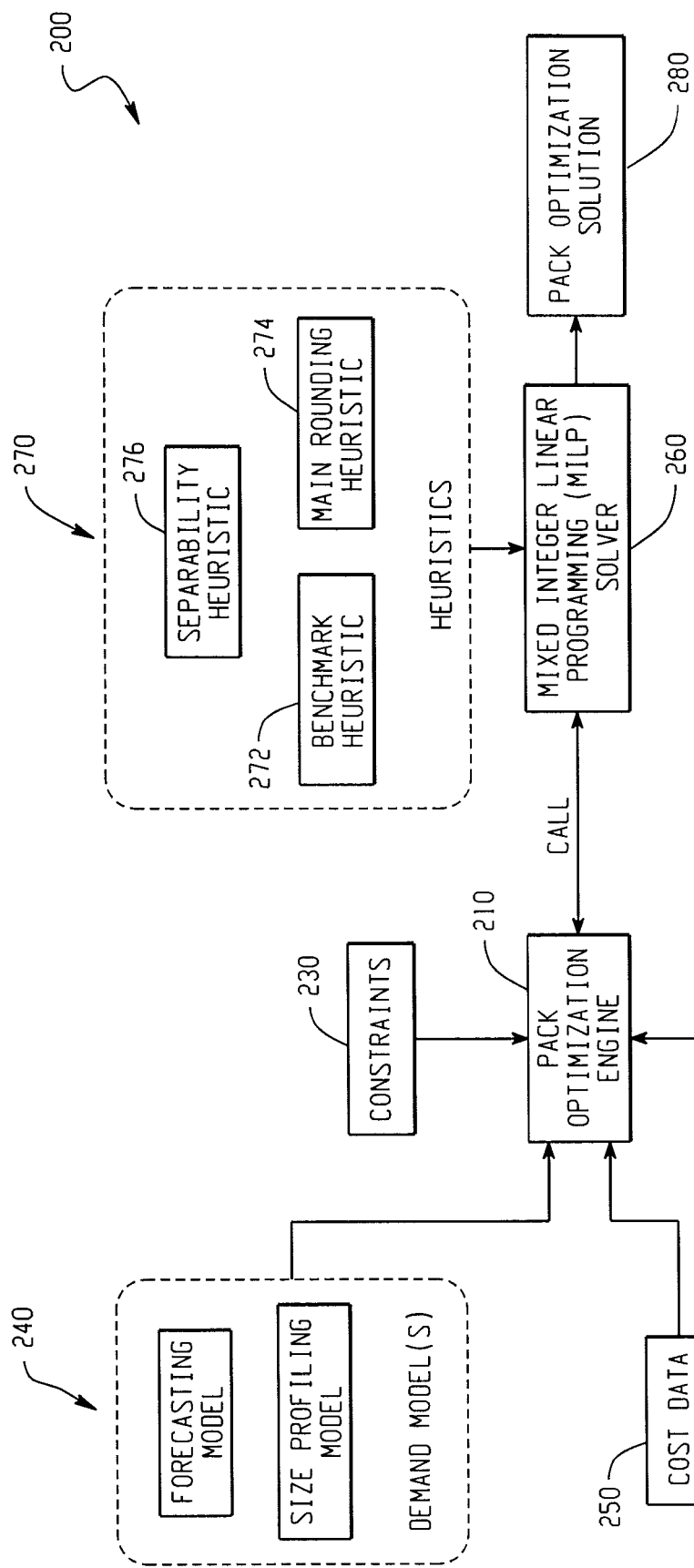
FIG. 2 is a block diagram depicting elements of an example pack optimization system.

FIG. 2 depicts at 200 an example pack optimization system for solving a pack optimization instance for an item among a plurality of end points of a distribution network. The pack optimization engine 210 accepts as input pack definitions 220, constraints 230, demand model(s) 240, and cost data 250. The pack definitions 220 describe the contents of packs for the pack optimization instance to be solved, as further defined by the constraints 230, the demand model(s) 240, and the cost data 250. For example, a national apparel retail chain could define a pack as a set of shirts of a particular style that are blue in color and that include three shirts of size medium, two shirts of size large, and one shirt of size small. The composition of packs may vary from one product to another, and separate pack optimization instances are generated for each product. Each such instance is solved using the pack optimization system. In addition, the retail chain could define more than one category of packs. Thus, packs as described above, containing six blue shirts, could be packaged together into a larger pack. In such an example, the six-shirt packs described above could be referred to as inner packs, while the packs containing multiple inner packs could be referred to as outer packs. Further, because outer packs potentially could contain a large quantity of an item, solutions generated by the pack optimization system may include assignment of both unopened outer packs and loose inner packs to a particular store, in which case loose inner packs would be removed from an opened outer pack, separated, and distributed accordingly. When solving a pack optimization instance, the pack optimization system will treat inner packs as units of distribution that cannot be separated.

The constraints 230 input to the pack optimization engine 210 may include any or all of a variety of values that the pack optimization engine 210 will use to limit what may be included in a planned distribution of packs that is output as the solution for a particular pack optimization instance. For example, there may be a limit on the overall number of outer packs that are available to be distributed to the distribution end points. Thus, if the sum of the forecast demand for all of the end points is higher than the number of units contained in the available number of outer packs, then the solution to the pack optimization instance may not fully satisfy the demand forecast for one or more of the distribution end points. Another example of a constraint that may be imposed within a pack optimization instance is a store_min_max constraint. In the example of a national apparel retail chain, the store_min_max constraint would force the total number of units across all sizes for each store to be between a store_min value and a store_max value. As discussed above, the use of the term "store" does not limit this constraint to the particular situation of allocating units to a retail location. For example, in the case of a multi-level distribution network, when modeling any level above the retail level, "store" would refer to some type of distribution center. A third example constraint is the demand_fit constraint. The demand_fit constraint, again with respect to the apparel chain example, links variables in the pack optimization solution to values included in the demand model(s) 240. Specifically, the NumOver and NumUnder variables in the pack optimization solution, which represent the number of units above or below forecast demand for a particular store and size, respectively, are linked to the demand values included in the demand model(s) 240 input to the engine 210.

Demand model(s) 240 is the third input to the pack optimization engine 210. The demand model 240, which may be specified by a user or generated using a computer-based modeling system, defines the quantity of each size of each item that is forecast to be needed at a particular distribution end point. The demand model may encompass modeling data generated from one or more computer-based modeling systems. For example, a forecasting model may be used to produce an overall forecast of demand for a particular item at a particular location. In the example of an apparel retail chain, another model that may be incorporated into the creation of a demand model is a size profiling model. A size profiling model could be used to predict the quantities of an item needed in each particular size, based for example, on geographic location and/or historical size demand data. The demand values thus produced are input into the pack optimization engine 210 and form the basis of the pack optimization instance.

The fourth input to the pack optimization engine 210 is cost data 250. Cost data 250 includes information such as handling costs or mismatch penalty costs, if applicable. The handling costs can be defined at multiple levels, such as the cost of shipping one inner pack or one unopened outer pack. The values for handling costs may represent, for example, the marginal cost of shipping a single inner pack or unopened outer pack, or they could be defined as some portion of the fully-loaded shipping cost for all of the items, however a distributing entity may define such cost. The mismatch penalty costs represent the cost to the entity, such as the retail chain, of providing too great or too small a quantity of item to a particular location, such as a retail store. Generally speaking, the cost might represent the revenue lost due to a lack of inventory of an item (in the case where too few units were supplied) or the revenue lost by selling a unit of an item at a marked down price (in the case where too many units were supplied). This cost data 250 is input to the pack optimization engine 210, and it is used to evaluate the costs associated with a particular solution to the pack optimization instance.

In situations where a distributing entity does not know what values would be appropriate for mismatch penalties, a cost adapter module can assist in generating these values based on more typical business data, such as markdown cost and lost sale cost. For example, the penalty for providing too great a quantity of a particular item could be defined as:

$$\text{over\_penalty}[\text{store,option}] = \text{markdown\_cost} * \text{store\_factor}[\text{store}] * \text{store\_option\_factor}[\text{store,option}]$$

where store_factor is a measure of relative importance of a given store (default value typically would be 1) and store_option_factor is obtained from normalizing the inverse of the size profile.

Once the pack optimization engine 210 has the input data necessary to generate the pack optimization problem, the engine 210 performs the operations needed to produce an optimal solution. This is accomplished through the use of heuristics 270, and the output of the engine 210 is a pack optimization solution 280, which the distributing entity may use to allocate its goods across its distribution network. Examples of heuristics 270 include the benchmark heuristic 272, the main rounding heuristic 274, and the separability heuristic 276. The heuristics incorporated into the pack optimization system are used to exploit pack-specific structure in the optimization formulation to reduce the computation time required to solve pack optimization formulations.

The benchmark heuristic 272 does not optimize the distribution of packs across a number of distribution end points. Rather, the heuristic attempts to mimic what a person would do "by hand" to optimize the distribution of packs across the distribution end points. Pack optimization problems under an example benchmark heuristic proceed by alternating between an assignment step, in which inner packs are assigned to one of the end points in the distribution hierarchy, and an ordering step, in which additional outer packs are ordered if needed to satisfy unmet need at one or more distribution end points. In the assignment step, loose inner packs are assigned among the distribution end points in decreasing order of remaining need at the distribution end points. Because inner packs are packaged according to fixed formulations, the remaining need at a distribution end point for a particular size or color of an item may be negative. If some of the distribution end points have negative numbers for their remaining need of one or more sizes or colors, then end points where all remaining need numbers are positive will be favored.

Once all distribution end points have some need value that is negative, the example benchmark heuristic would return to assigning inner packs first to those end points with the greatest total remaining need, while also attempting to minimize the mismatch penalty that results from increasing the oversupply of one or more items (e.g., items of size large or color red). This is repeated until all remaining inner packs have been assigned.

The ordering step of the benchmark heuristic proceeds by analyzing, for each end point with positive total remaining need, which pack has size proportions that most closely match the proportions of that end point's remaining need. The number of inner packs necessary to satisfy the end point's total remaining need is rounded to an integer value. Next, a local search is performed for each end point using three moves: 1) adding an inner pack; 2) removing an inner pack; and 3) replacing one inner pack with another. These moves are repeated until each end point's order is locally optimal, or in other words, the solution could not be improved by any additional moves. The resulting values of additional inner packs to be assigned across all end points are totaled and rounded to the nearest value for additional outer packs, while ensuring that the NumOuters_max[pack] constraint is not violated. If an iteration of the ordering step results in one or more additional outer packs being ordered, then those outer packs are broken up into loose inner packs and the heuristic returns to the assignment step, described above.

Figure 6:
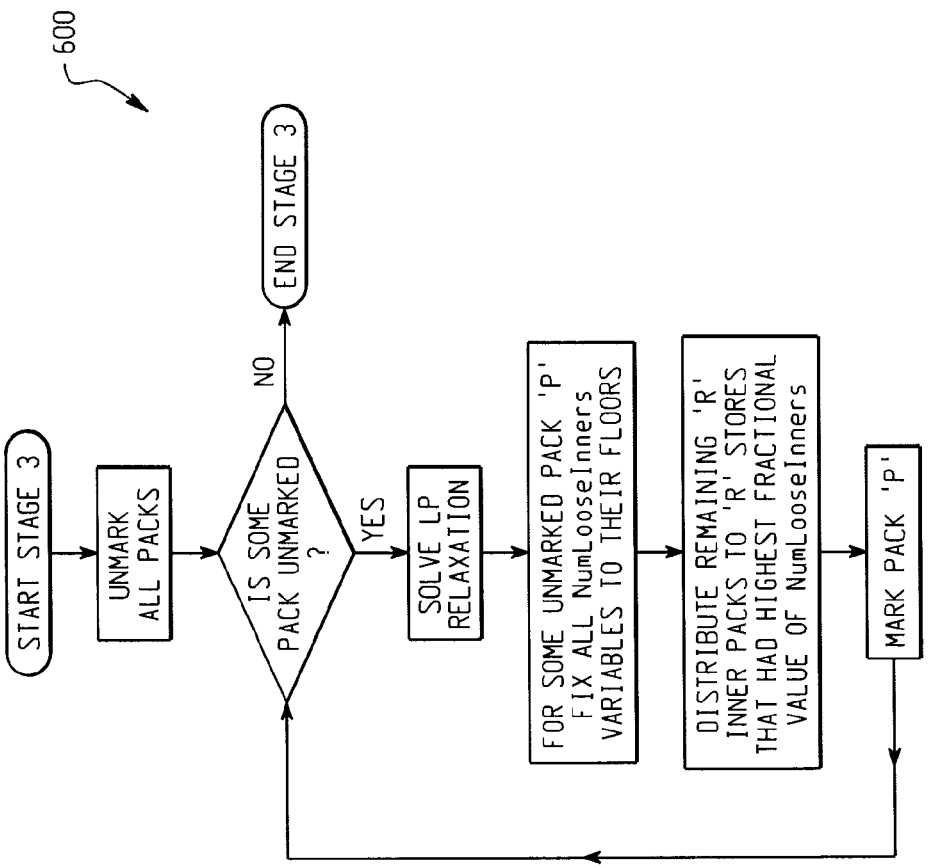
FIG. 6 is a flow diagram depicting the steps of the third stage of a main rounding heuristic.
Figure 5:
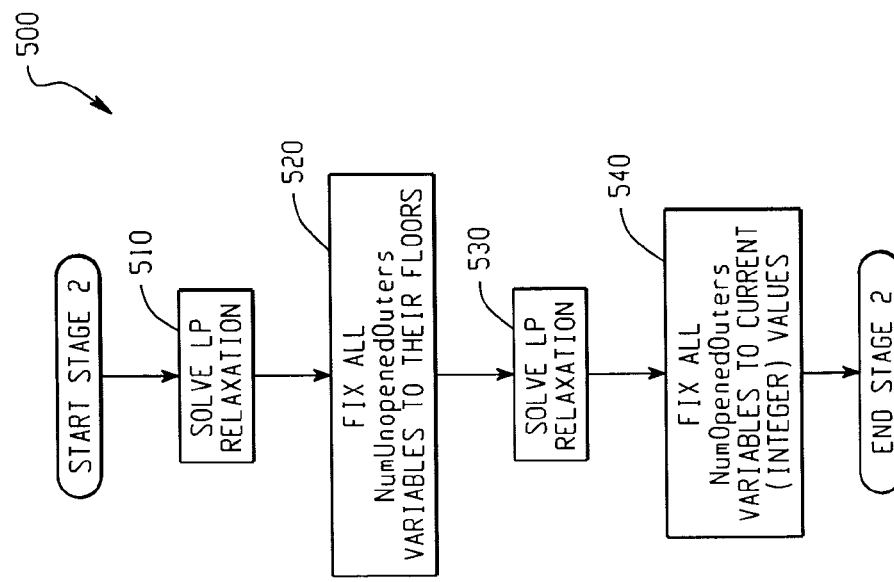
FIG. 5 is a flow diagram depicting the steps of the second stage of a main rounding heuristic.
Figure 7:
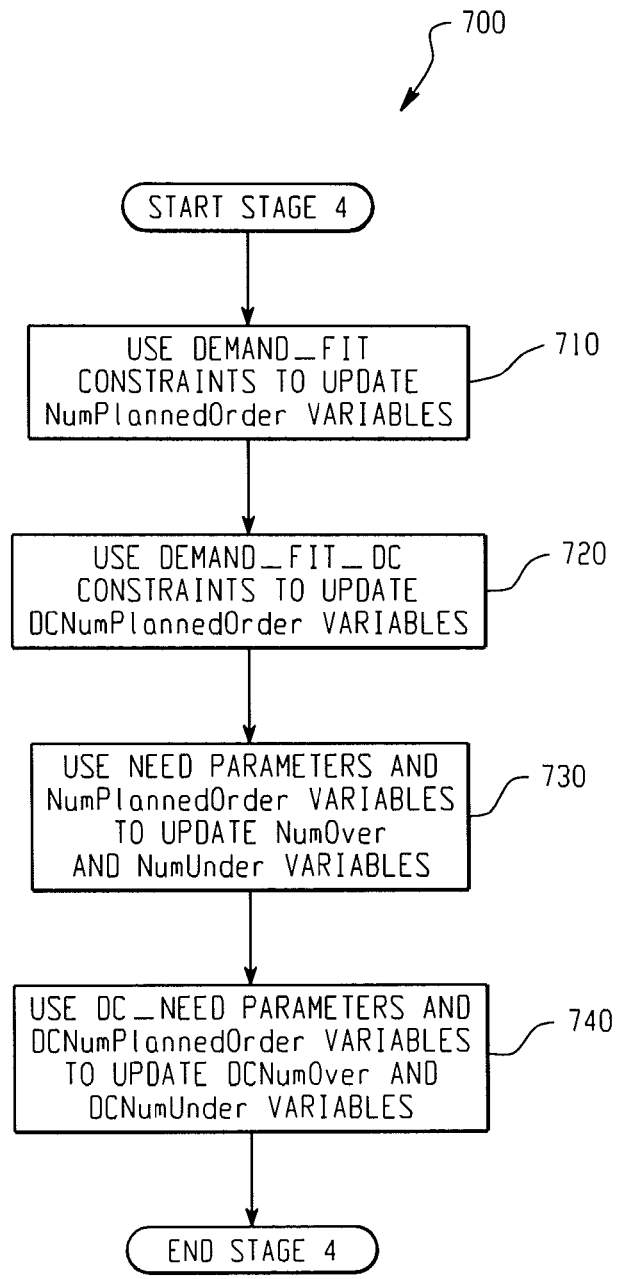
FIG. 7 is a flow diagram depicting the steps of the fourth stage of a main rounding heuristic.
Figure 8:
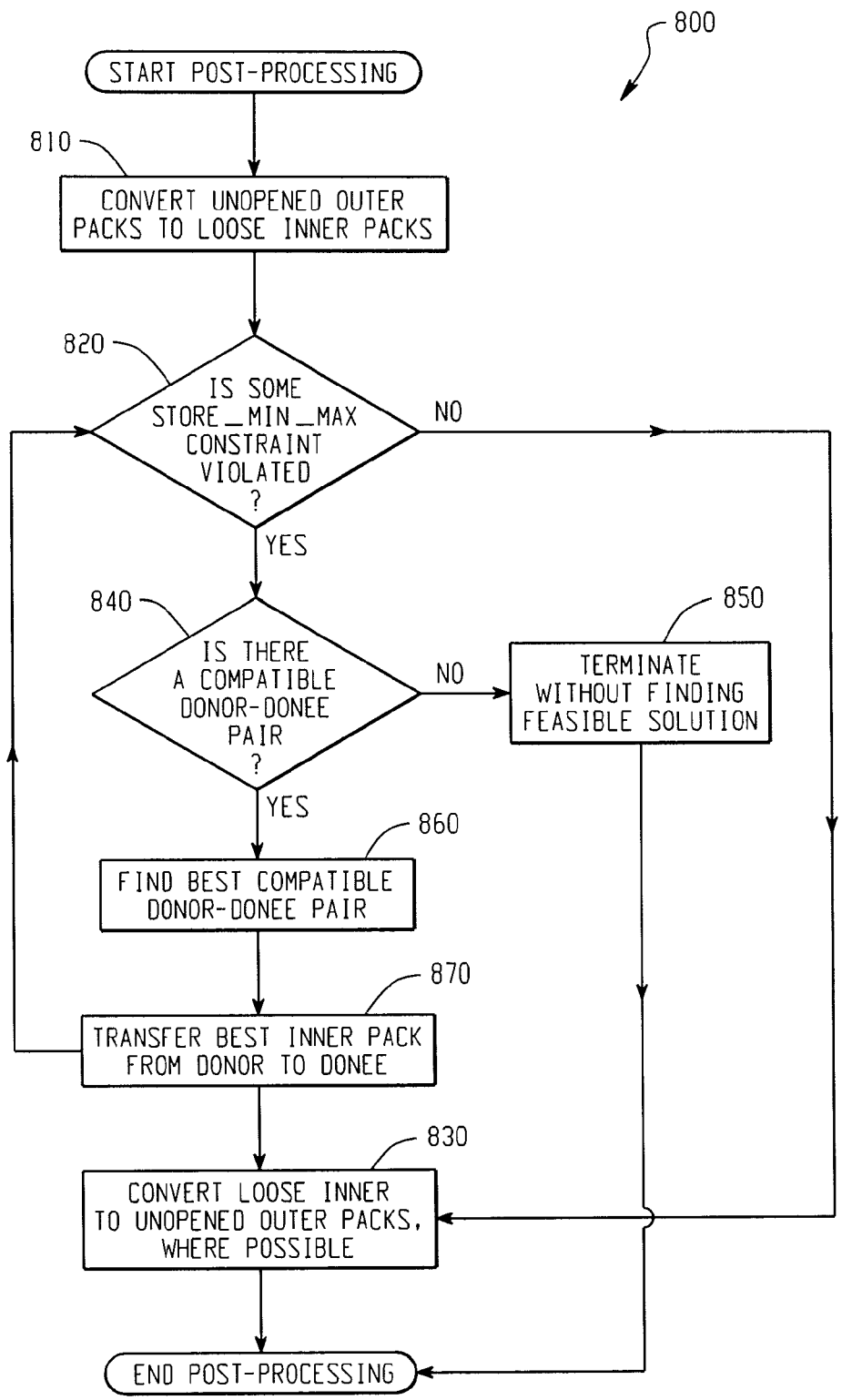
FIG. 8 is a flow diagram depicting the steps of post-processing that occur in an example pack optimization system.

FIG. 3 depicts at 300 a flow diagram showing the stages that comprise an example main rounding heuristic. The four stages listed, plus the post-processing operations, are described in greater detail with respect to FIGS. 4-8 below. The operations depicted in the four stages are necessary to fix the four main families of integer decision variables that are part of the solution to the pack optimization formulation: NumOuters, NumOpenedOuters, NumUnopenedOuters, and NumLooseInners. FIG. 4 shows the steps taken in an example main rounding heuristic to fix all values of the NumOuters variables in the solution to integer values. FIG. 5 depicts the operations involved in fixing the NumUnopenedOuters and NumOpenedOuters variables, which sum to equal NumOuters. FIG. 6 depicts the steps taken to set the NumLooseInners variables. FIG. 7 shows the calculation of several auxiliary decision variables based on the values derived from solving the optimization formulations and the constraints input to the pack optimization system. FIG. 8 depicts the post-processing done to ensure, for example, that no constraints are violated and that the solution to the pack optimization formulation is as efficient as possible (e.g., by attempting to convert loose inner packs to unopened outer packs where possible). The use of ordinal terms, such as the modifier "first" in "first stage," is not meant to imply a particular order for the steps described herein with respect to FIGS. 4-8. Rather, the ordinal terms are used only to structure the description of the main rounding heuristic in order to make it easier to understand.

FIG. 4 depicts at 400 a flow diagram showing the operations involved in a first stage of an example main rounding heuristic. Initially, a generic LP solver may be used to solve the LP relaxation (obtained by ignoring integrality constraints on all decision variables) of the MILP optimization formulation, as depicted at 410. Solving the LP relaxation with a generic LP solver is significantly less compute-intensive than direct solving of the MILP optimization formulation. As a trade-off, the solution to the LP relaxation most likely will not conform to the constraint that the output values include only integers. Thus, in this stage, at 420, the output values for the NumOuters variables for the various distribution end points are analyzed to determine whether any of the values are non-integer (i.e., they include a fractional portion). If any of the values are non-integer, then one or more of the non-integer NumOuters variables is fixed to an integer value, as shown at 430. For example, the heuristic may round the NumOuters variable with a value that is closest to an integer. In another example, the heuristic may choose the NumOuters variable having a value that includes the largest fractional portion and create two branches. In the first branch, the upper bound for the chosen value is set to the integer portion of the value (i.e., the value is rounded down) and in the second branch, the lower bound for the chosen value is set to the next highest integer value (i.e., the value is rounded up). The heuristic then would evaluate the LP objective values produced in each branch and choose the branch that produced the smaller LP objective value.

Once the one or more variables are set to integer values, those variables (and any variables previously set to integer values) are held constant, and the step of solving the LP relaxation 410 is repeated, using the same LP solver. These steps are repeated as many times as necessary to set all of the NumOuters variables to integer values. Once all of the NumOuters variables have been set to integer values, the NumOuters values are fixed to the integer values, as shown at 440. Once the NumOuters values are fixed, the first stage of the example main rounding heuristic is complete, and the example main rounding heuristic can continue to the second stage.

FIG. 5 depicts at 500 a second stage of an example main rounding heuristic. As depicted at 510, and like the first stage, the second stage begins with the use of a generic LP solver to solve the LP relaxation. In this example, all NumOuters values have been fixed as integers, and the main rounding heuristic will focus on fixing the values of another of the main integer decision variables, in this case NumUnopenedOuters. NumUnopenedOuters represents the number of unopened outer packs to be sent to a particular distribution end point. In the example main rounding heuristic at 520, the value of each NumUnopenedOuters variable is rounded down and fixed at that integer value. The LP relaxation is solved again (step 530) and the value of each NumOpenedOuters variable is set to its then-current integer value, as shown at 540. With these variables set to integer values, the example main rounding heuristic continues to the third stage.

FIG. 6 depicts at 600 a third stage of an example main rounding heuristic. In this stage, the heuristic again solves the LP relaxation, in which the variables previously fixed to integer values are held constant, which leaves the fourth main integer decision variable, NumLooseInners, to be fixed. Because NumOpenedOuters has been set, and each outer pack contains a set number of inner packs, the value of NumLooseInners is constrained by the product of NumOpenedOuters times the number of inner packs in each outer pack. So, in the solution to the LP relaxation, all values for NumLooseInners are first rounded down. The heuristic determines a remainder R according to the formula:

$$R = NumOpenedOuters * P - \sum_{i=1}^{n} L_i$$

where NumOpenedOuters is the number of opened outer packs, P is the quantity of inner packs contained in each outer pack, and $L_i$ is the loose inner pack value for distribution end point i. The heuristic selects the R distribution end points for which the value of the NumLooseInners variable had the highest fractional portion and increases the NumLooseInners values by one for each of the R distribution end points selected. Once this is complete, the pack optimization solution has accounted for all of the available loose inner packs and the example main rounding heuristic continues to the fourth stage.

FIG. 7 depicts at 700 a fourth stage of an example main rounding heuristic. In the fourth stage, the main rounding heuristic uses the input constraints and the fixed integer values of the main integer decision variables to update the values for the auxiliary decision variables. At 710, the demand_fit constraints are used to update the NumPlannedOrder variables. Further, as depicted at 720, the demand_fit_DC constraints are used to update the DCNumPlannedOrder variables. The need parameters and the NumPlannedOrder variables are used, at 730, to update the NumOver and NumUnder variables. Also, as shown at 740, the dc_need parameters and DCNumPlannedOrder variables are used to update the DCNumOver and DCNumUnder variables. Once the auxiliary decision variables have been updated, the example main rounding heuristic proceeds to run the post-processing operations.

FIG. 8 depicts at 800 the post-processing operations of a heuristic. For purposes of the calculations required for post-processing, all unopened outer packs are treated as loose inner packs (step 810), in a quantity equal to the number of unopened outer packs times the number of inner packs contained in each outer pack. At 820, the heuristic checks the values allocated to each distribution end point against the store_min_max constraints for each distribution end point, to determine if the proposed solution violates any of the constraints. If none of the constraints is violated, the process proceeds to 830, where it is determined whether any of the NumLooseInners quantities in the proposed solution are high enough to convert to an additional unopened outer pack. If so, the NumLooseInners for that distribution end point is reduced by an amount equal to the quantity of inner packs in an outer pack and the NumUnopenedOuters quantity for that distribution end point is increased by one. Once step 830 is completed, the post-processing operations end and the heuristic is complete. The pack optimization solution may be output by the pack optimization system.

On the other hand, if at 820 the proposed solution to the pack optimization problem is found to violate one or more store_min_max constraints, the heuristic attempts to alter the solution to satisfy the violated constraints. As depicted at 840, the heuristic searches for "donor" end points, which are those end points that may have their allocations reduced without causing a violation of the store_min constraint for that end point, and for "donee" end points, which are those end points that may have their allocations increased without causing a violation of the end point's store_max constraint. Distribution end points that may serve as donors or donees are considered compatible when an inner pack can be transferred from the donor to the donee without violating the donor's store_min constraint or the donee's store_max constraint. If no suitable donor-donee pairs are identified, then the post-processing operations terminate, as depicted at 850, without producing a feasible solution.

If one or more compatible donor-donee pairs are identified, then the most efficient pairings of donor and donee are those in which the allocations for both end points violate a constraint, as the opportunity exists to cure two violations at once, and the heuristic will search for the best compatible donor-donee pair first, as shown at step 860. Further, end points preferably are processed in decreasing order of difference in end point need satisfaction, which is the percentage by which the proposed allocation is over or under the end point's need. For a compatible donor-donee pair, the inner pack chosen to be transferred is one that minimizes the resulting mismatch cost. As shown at 870, once the best donor-donee match has been identified, an inner pack is transferred between the compatible distribution end point pairs. The example heuristic then returns to step 820 to repeat the process. The process will repeat until either all of the violations of the store_min_max constraints have been cured or there are no further compatible end point pairs. Once either all violations of the store_min_max constraints have been cured or no additional compatible donor-donee pairs can be identified by the heuristic, the heuristic proceeds to step 830, as discussed above, and attempts to determine whether any of the NumLooseInners quantities in the proposed solution are high enough to convert to an additional unopened outer pack. Once complete, the post-processing operations end and the heuristic is complete. The solution to the pack optimization problem may be output by the pack optimization system.

In certain distribution situations, such as where the total number of units that is to be allocated is much larger or much smaller than the total number of units needed at the distribution end points, a small subset of the distribution end points may end up bearing the brunt of the resulting surplus or deficit. The MILP formulation as described above would not prevent a pack optimization solution from including this type of misallocation, because when two solutions have sums of handling costs and mismatch penalty costs that are equal, the solutions are considered equally desirable. Thus, for example, if there are ten excess units and all stores have the same over penalties, the solver will be indifferent between a solution in which one store is assigned all ten extra units and a solution in which each of ten stores is assigned one extra unit.

There are approaches that may be used to resolve such imbalances in the pack optimization solution. Examples of these approaches include the use of secondary objectives, the introduction of piecewise linear mismatch penalties with an arbitrary number of breakpoints, quadratic mismatch penalties and mixed-integer quadratic programming (MIQP) problem modeling, and general nonlinear mismatch penalties and mixed-integer nonlinear programming (MINLP) problem modeling. The use of secondary objectives, for example, could involve minimizing the maximum NumOver[store,option] or NumUnder[store,option] across all stores and options. This could be implemented within a standard MILP formulation, which thus would require only a single solving iteration, by minimizing the value of:

HandlingCost+MismatchPenaltyCost+balance_factor*(NumOverMax+NumUnderMax).

In this formulation, if balance_factor=0, the factor drops out, leaving the otherwise-standard MILP formulation. Further, the larger the value of balance_factor, the more aggressive the factor will be in preventing imbalance.

The mismatch penalties described above with respect to MILP problem formulation take the form of piecewise linear mismatch penalties with one breakpoint and two segments (V-shaped). A natural generalization of the mismatch penalty concept would be the use of piecewise linear mismatch penalties with an arbitrary number (N) of breakpoints and N+1 segments. A user of the system would provide the breakpoints and the slope for each segment. If the objective function is convex (a natural restriction corresponding to increasing slopes), appropriate changes to the MILP model preserve linearity.

The use of quadratic mismatch penalties would naturally discourage imbalanced solutions because balanced solutions would result in smaller objective function values. The model that would result from the use of quadratic mismatch penalties would be mixed integer quadratic programming (MIQP) rather than MILP. The use of quadratic mismatch penalties and MIQP increases the burden on a user of the system to provide such penalties in the input. In addition, if no solver for MIQP is available, this method can be approximated using a piecewise linear objective function.

In the last example of a method for reducing imbalances in the pack optimization solution, general nonlinear mismatch penalties may be used. Such a method is a more general version of the quadratic mismatch penalty example described above. As with the quadratic mismatch penalty example, though potentially to an even greater degree, the use of general nonlinear mismatch penalties places a significant burden on a user of the system to supply penalties in the input. The model resulting from this method would be mixed integer non-linear programming (MINLP) rather than MILP. Also, as with the MIQP method above, if no MINLP solver is available, this method can be approximated using a piecewise linear objective function.

Figure 9:
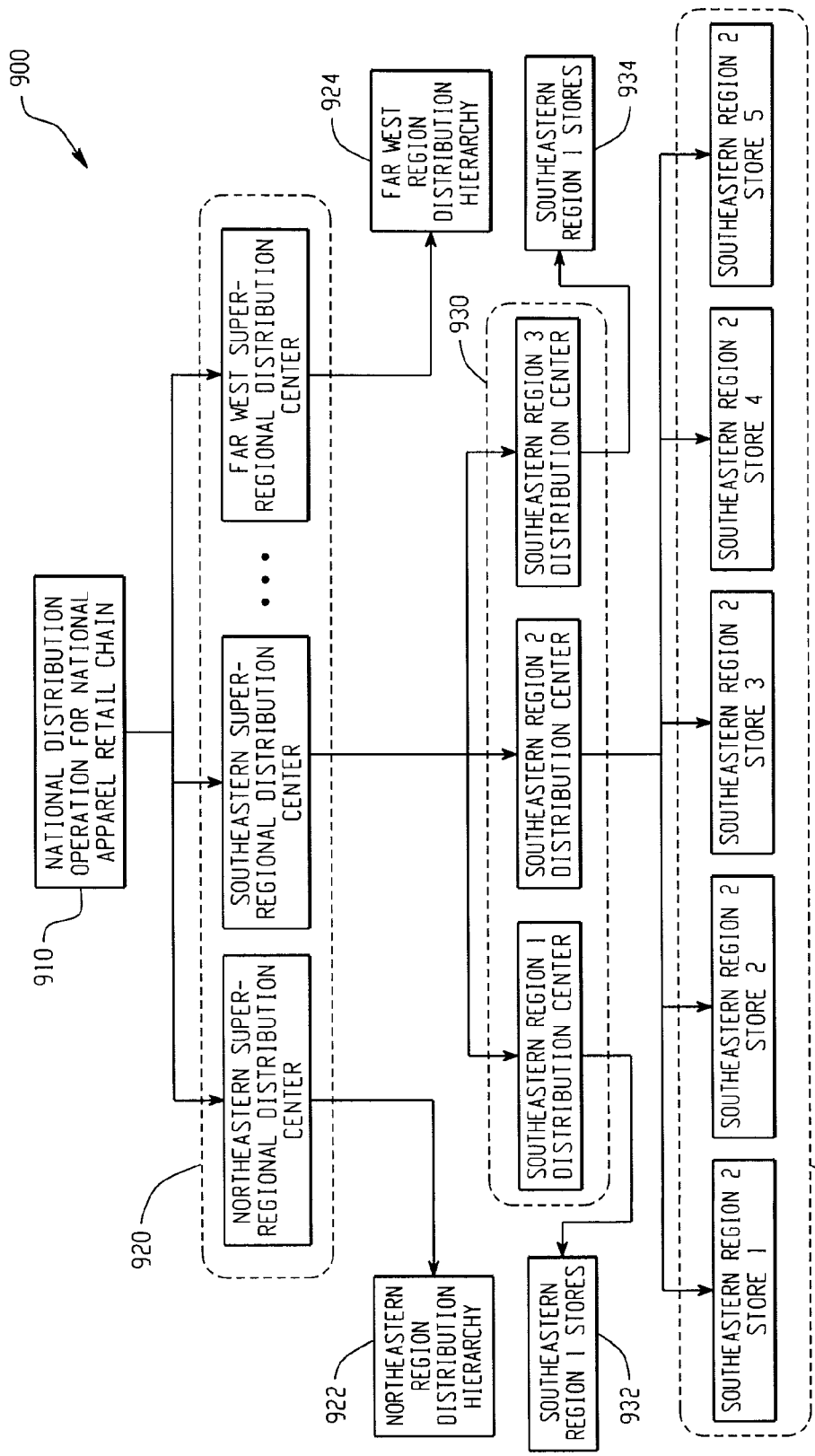
FIG. 9 is a block diagram depicting an example distribution hierarchy containing multiple levels.

FIG. 9 depicts at 900 an example distribution hierarchy containing multiple levels. In situations where an entity wishes to solve a pack optimization problem in such a multiple-level distribution hierarchy, the pack optimization problem may be split into two or more separate pack optimization problems (e.g., "sub-problems"), where each of the sub-problems is solved independently and the solutions to the sub-problems are combined to produce a single overall pack optimization solution. In an example situation where this procedure may be used to allocate packs, the pack optimization system determines whether one or more of a plurality of entities responsible for distributing and/or selling an item only distributes and/or sells that item to another of the plurality of entities responsible for distributing and/or selling the item. If so, the pack optimization system removes from the pack optimization problem those entities that only distribute and/or sell to another of the plurality of entities.

Once the pack optimization system has removed the additional levels of distribution entities, the system specifies constraint values that limit what values may be included in the solution to the pack optimization problem. As with the example non-multiple-level pack optimization instance described above, constraint values may be derived from other statistical models, such as a size profiling model. The pack optimization system applies a heuristic to reduce the computation time required to solve the pack optimization problem, as is the case in the example non-multiple-level pack optimization instance described above. The pack optimization system uses a mixed-integer linear programming solver to solve a pack optimization problem, which produces optimized values for numbers of packs to be distributed to each of the remaining plurality of entities responsible for distributing and/or selling the item. This step, too, is performed in a manner similar to that described above with respect to an example non-multiple-level pack optimization instance.

The pack optimization system performs further processing on the values in the pack optimization solution determined as described above to ensure that the optimized values for numbers of packs satisfy the constraint values applicable to the pack optimization problem. Once the sub-problem has been solved as described, any of the plurality of entities that were removed from the optimization problem as described above are optimized. The pack optimization system repeats the steps described above for each of those entities that were removed from the optimization problem. In addition, the pack optimization solution or solutions determined during the one or more previous iterations of the steps described above may constitute one or more inputs to the next iteration of solving one of the sub-problems.

As an example, the national distribution operation for a national apparel retail chain 910 is responsible for distributing the chain's apparel to its stores. In the example, however, the distribution operation 910 only directly distributes the apparel to a group of super-regional distribution centers 920. The super-regional distribution centers 920 are themselves responsible for distributing apparel to a group of regional distribution centers, such as the regional distribution centers 930 that are associated with the southeastern super-regional distribution center. The other super-regional distribution centers also are responsible for distribution hierarchies (922 and 924), though those hierarchies are not depicted. As the national distribution operation is responsible for distributing to another entity that also distributes, in this example the pack optimization system would remove the national distribution system from the pack optimization problem and instead first solve one of the sub-problems, such as that for the southeastern super-region. In this example, each of the group of regional distribution centers 930 is responsible for a number of retail stores, for example, the five stores 940 associated with the southeastern region 2 distribution center. As with the higher level in the hierarchy, the other regional distribution centers are responsible for groups of stores as well (932 and 934), though those groups are not depicted. Since the super-regional distribution centers 920 in this example also distribute only to entities (the regional distribution centers) that are themselves responsible for distributing to other sales or distribution entities (the retail stores), the super-regional distribution centers also would be removed from the pack optimization problem and the sub-problem of a particular regional distribution center within the super-region would be solved. Once the lower-level sub-problems have been solved, the pack optimization system then can return to solving the super-regional and national optimization problems.

Figure 10:
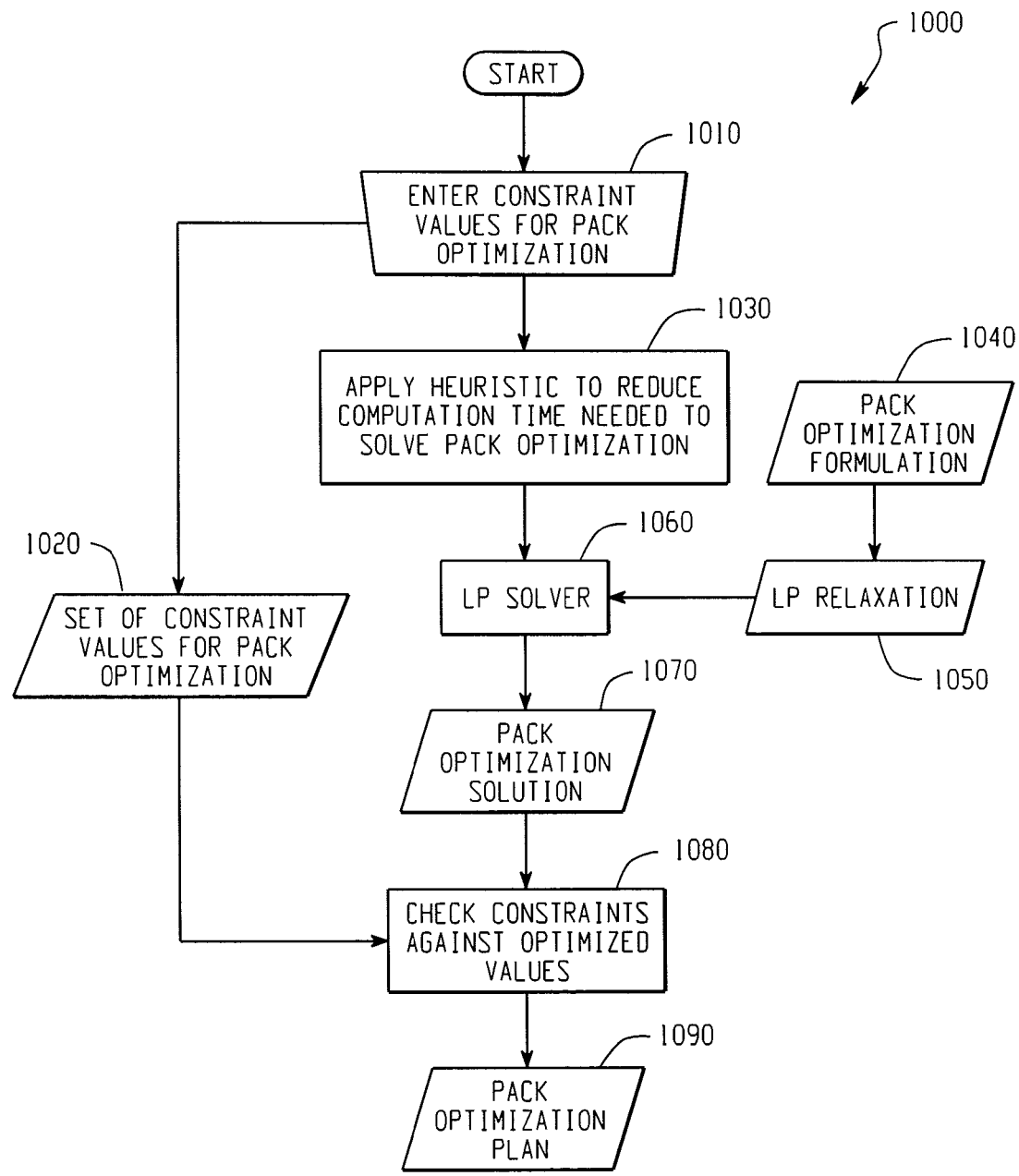
FIG. 10 is a flow diagram depicting an example method for solving a pack optimization instance for an item.

FIG. 10 depicts an example method for solving a pack optimization problem for an item among a plurality of retail stores. At step 1010, constraint values are specified that limit what values may be included in the solution of the pack optimization instance, which produces, as depicted at 1020, the set of constraint values for the pack optimization instance. Step 1030 depicts application of a heuristic to reduce the computation time required to solve the pack optimization problem, which is described by the pack optimization formulation 1040. The integrality constraints on the optimization formulation are ignored as part of the heuristic 1030, producing LP relaxation 1050, which typically will require less computation time to solve than direct solving of mixed integer linear programming solutions requires. At step 1060, a linear programming (LP) solver is used to model the pack optimization problem and determine optimized values for numbers of packs to be distributed to the plurality of retail stores. The solving of the LP relaxation produces pack optimization solution 1070. At 1080, the pack optimization solution 1070 is processed to ensure that the optimized values for numbers of packs satisfy the constraint values 1020 applicable to the proposed solution. The result is the pack optimization plan 1090.

While examples have been used to disclose the invention, including the best mode, and also to enable any person skilled in the art to make and use the invention, the patentable scope of the invention is defined by claims, and may include other examples that occur to those skilled in the art. Accordingly the examples disclosed herein are to be considered non-limiting.

It is further noted that the systems and methods may be implemented on various types of computer architectures, such as for example on a single general purpose computer (as shown at 1100 on FIG. 11) or workstation, or on a networked system, or in a client-server configuration, or in an application service provider configuration.

It is further noted that the systems and methods may include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented method for optimizing a distribution, comprising:
   receiving, using one or more data processors, inner pack definition data identifying a number of items within an inner pack, wherein each item is available in one or more varieties, and wherein the inner pack definition data includes a number of each variety in the inner pack;
   receiving, using the one or more data processors, outer pack definition data associating a number of inner packs with an outer pack;
   receiving, using the one or more data processors, demand data identifying a predicted demand for each variety of an item at one or more stores;
   receiving, using the one or more data processors, one or more constraint values, wherein each constraint value identifies one or more limitations on a planned distribution of packs;
   generating, using the one or more data processors, a pack optimization problem using the inner pack definition data, the outer pack definition data, the demand data, and the one or more constraints;
   generating, using the one or more data processors, a revised pack optimization problem using one or more heuristics, wherein a heuristic performs a linear programming relaxation upon the pack optimization problem, and wherein solving the revised pack optimization problem requires less computation time than solving the pack optimization problem; and
   generating, using the one or more data processors, the planned distribution of packs by solving the revised pack optimization problem, wherein solving includes using a mixed-integer linear programming solver to determine the number of inner packs and the number of outer packs that best fulfill the predicted demand for each of the one or more stores, and wherein solving further includes subtracting an inner pack from a particular store and adding the subtracted inner pack to another store based on a particular constraint value.

2. The method of claim 1, further comprising:
   verifying that the planned distribution of packs satisfies the one or more constraint values.

3. The method of claim 1, wherein the heuristic is a main rounding heuristic, and wherein the main rounding heuristic solves the linear programming relaxation and fixes one or more variables within the linear programming relaxation.

4. The method of claim 3, wherein the outer packs may be opened and separated as part of the planned distribution.

5. The method of claim 4, wherein the main rounding heuristic includes determining integer values of outer packs to be distributed to the plurality of stores, determining integer values of unopened outer packs to be distributed to each of the plurality of stores, determining integer values of inner packs from opened outer packs to be distributed to each of the plurality of stores, and updating the determined integer values based on the constraint values.

6. The method of claim 5, wherein determining an integer value for a number of outer packs to be distributed to the one or more stores further comprises:
   solving the linear programming relaxation; and
   rounding the number of outer packs to be distributed to the one or more stores.

7. The method of claim 5, wherein determining an integer value for a number of unopened outer packs to be distributed to each of the one or more stores further comprises:
   rounding down the number of unopened outer packs distributed to each of the one or more stores.

8. The method of claim 5, wherein determining an integer value for a number of loose inner packs to be distributed to each of the one or more stores further comprises:
   rounding down a number of inner packs assigned to a first store, the rounding down generating a remainder of inner packs; and
   adding the remainder of inner packs to one or more second stores.

9. The method of claim 1, wherein one or more of the one or more stores are over supplied in the planned distribution of packs, and wherein one or more of the one or more stores are under supplied in the planned distribution of packs.

10. The method of claim 1, wherein pack optimization problems are solved iteratively at different levels of a hierarchy.

11. The method of claim 1, wherein the constraint values are generated using a demand modeling method.

12. The method of claim 1, wherein the constraint values are associated with a minimum number of units to be distributed to a particular store, a maximum number of units to be distributed to a particular store, or a minimum number of units to be distributed to each store in the one or more stores.

13. The method of claim 1, wherein demand data associated with store to store demand is removed from the received demand data.

14. A computer-implemented system for optimizing a distribution, comprising:
   one or more data processors;
   one or more computer-readable storage mediums containing instructions configured to cause the one or more processors to perform operations including:
     receiving inner pack definition data identifying a number of items within an inner pack, wherein each item is available in one or more varieties, and wherein the inner pack definition data includes a number of each variety in the inner pack;

receiving outer pack definition data associating a number of inner packs with an outer pack;

receiving demand data identifying a predicted demand for each variety of an item at one or more stores;

receiving one or more constraint values, wherein each constraint value identifies one or more limitations on a planned distribution of packs;

generating a pack optimization problem using the inner pack definition data, the outer pack definition data, the demand data, and the one or more constraints;

generating a revised pack optimization problem using one or more heuristics, wherein a heuristic performs a linear programming relaxation upon the pack optimization problem, and wherein solving the revised pack optimization problem requires less computation time than solving the pack optimization problem; and generating the planned distribution of packs by solving the revised pack optimization problem, wherein solving includes using a mixed-integer linear programming solver to determine the number of inner packs and the number of outer packs that best fulfill the predicted demand for each of the one or more stores.

15. A computer-program product for optimizing a distribution, tangibly embodied in a machine-readable non-transitory storage medium, including instructions configured to cause a data processing apparatus to:

receive inner pack definition data identifying a number of items within an inner pack, wherein each item is available in one or more varieties, and wherein the inner pack definition data includes a number of each variety in the inner pack;

receive outer pack definition data associating a number of inner packs with an outer pack;

receive demand data identifying a predicted demand for each variety of an item at one or more stores;

receive one or more constraint values, wherein each constraint value identifies one or more limitations on a planned distribution of packs;

generate a pack optimization problem using the inner pack definition data, the outer pack definition data, the demand data, and the one or more constraints;

generate a revised pack optimization problem using one or more heuristics, wherein a heuristic performs a linear programming relaxation upon the pack optimization problem, and wherein solving the revised pack optimization problem requires less computation time than solving the pack optimization problem; and generate the planned distribution of packs by solving the revised pack optimization problem, wherein solving includes using a mixed-integer linear programming solver to determine the number of inner packs and the number of outer packs that best fulfill the predicted demand for each of the one or more stores.

16. The computer-program product of claim 15, wherein the non-transitory storage medium is a RAM.

* * * * *